United States Patent [19]

Halbig

[11] Patent Number: 4,856,059
[45] Date of Patent: Aug. 8, 1989

[54] SEMICONDUCTOR SUBSCRIBER LINE INTERFACE CIRCUIT WITH ENHANCED SURVIVABILITY

[75] Inventor: Walter A. Halbig, Huntsville, Ala.

[73] Assignee: ITEC, Inc., Huntsville, Ala.

[21] Appl. No.: 120,067

[22] Filed: Nov. 13, 1987

[51] Int. Cl.$^4$ .............................................. H04M 1/74
[52] U.S. Cl. .................................... 379/412; 379/399;
379/413; 361/106; 361/119
[58] Field of Search ............... 379/399, 412, 413, 405;
361/56, 103, 106, 118, 119

[56] References Cited

U.S. PATENT DOCUMENTS

| | | | |
|---|---|---|---|
| 4,477,857 | 10/1984 | Crocker | 379/412 X |
| 4,563,547 | 1/1986 | Booth | 379/399 X |
| 4,661,979 | 4/1987 | Jakab | 379/412 |
| 4,709,296 | 11/1987 | Hung et al. | 379/412 |

OTHER PUBLICATIONS

Harris Corporation. "Subscriber Line Interface Circuit", HC5509, Feb. 1987 (Preliminary).
Harris Corporation App Note No 549, "The HC-550X Telephone Subscriber Line Interfade Circuits (SLIC)", Phillips, Geoff.
Midwest Components, Inc. Product Data, "Section: 4007 Poly PTC Current Protector".

Primary Examiner—James L. Dwyer
Attorney, Agent, or Firm—Cushman, Darby & Cushman

[57] ABSTRACT

A subscriber line interface circuit using integrated semiconductor circuit is provided with improved immunity to overvoltage and overcurrent conditions by increasing value of the battery feed resistors in series circuit with the ring and tip lines to increase the impedance encountered by a lightning-induced voltage spike to increase the survivability of the semiconductor circuit components. The battery supply voltage is increased to effect a commensurate increase in loop current, and the loop impedance is re-adjusted by appropriately configured operational amplifiers. A thermally responsive sensor is mounted in a heat-conducting relationship with resistive elements in the subscriber loop with an increase in temperature representing an overcurrent situation, such as power line cross-over, and provides a control signal effective to disconnect the subscriber loop from interface circuit.

32 Claims, 3 Drawing Sheets

SEMICONDUCTOR SUBSCRIBER LINE INTERFACE CIRCUIT WITH ENHANCED SURVIVABILITY

BACKGROUND OF THE INVENTION

The present invention relates to telephone systems and, more specifically, to interface circuits for interfacing the subscriber line circuit with a switching office.

In telephone systems, the subscriber line circuit is connected with its end switching office by an interface circuit which performs a number of communication functions such as providing battery feed voltage at a selected loop current into the subscriber loop, overvoltage and overcurrent protection, implementing the ringing function, conversion from the two-wire loop to four-wire system, encoding and decoding of the analog voice signals, and supervisory control functions. Historically, these communication functions have been addressed by a variety of electrical and electromechanical circuits that typically included resistive, inductive, and capacitive components with electro-mechanical switches. In addition to a general requirement for reliable operation, the subscriber interface circuit must meet certain 'survivability' requirements with regard to short-duration high-voltage spikes caused by lightning strikes between the subscriber station and the end office and overvoltage conditions caused by a 60 Hz power line (e.g., 120 or 240 VAC) circuit crossed to a telephone subscriber loop, the latter condition typically occurring as a result of a storm. In order to provide a measure of protection against these abnormal voltage situations, the subscriber loop is provided with voltage spike protectors of various types that shunt the subscriber loop and function to limit the effect of a lightning-induced voltage spike. Additionally, fusible components are connected in the subscriber loop and are designed to disconnect the circuit in an overcurrent situation typically caused by the presence of power line voltages on the subscriber loop. The use of fused circuits provides an assurance of overcurrent protection but presents a maintenance and service requirement in that a serviceman must replace the fusible components. In addition to these protective devices, the discrete electrical components historically used in subscriber circuits, including transformers, balance inductors, and the like, have an inherent immunity as a consequence of their current carrying capability and thermal capacity.

With the advent of digital switching systems, semiconductor devices are used to implement the traditional interface circuit functions. For example, monolithic integrated-circuit devices, as represented by the HC-550X-series subscriber line interface circuit manufactured by the Semiconductor Analog Products Division of the Harris Corporation of Melbourne, Fla., provide many of the above-described functions in a single integrated circuit. When combined with a digital coder/decoder and related interface components, a compact and efficient interface can be provided.

In general, semiconductor devices have a lower tolerance to overvoltage and overcurrent situations as compared to the discrete electrical devices historically used in interface circuits. While the semiconductor devices provide all the intended circuit functions, questions as to ultimate survivability have tended to limit use of semiconductor interface circuits to private-branch exchanges where the probability of lightning induced voltage spikes and power line cross-over is lower than in the traditional subscriber to end office connection. The questions as to the survivability of semiconductor subscriber interface circuits are of special concern in distributed end office systems in which a relatively small number of subscribers are connected to respective subscriber interface circuits located in the immediate area of the subscribers and which are connected by a carrier to the central office, in contrast to system organizations where all the subscribers are connected to the central office. In the former arrangement, an undue number of subscriber interface circuit failures requires a serviceman to travel to each location to effect repair while in the latter situation all repairs can be accomplished at one location.

SUMMARY OF THE INVENTION

In view of the above, it is an object of the present invention, among others, to provide a subscriber interface circuit that utilizes semiconductor integrated circuits and yet which has a materially improved survivability.

It is another object of the present invention to provide a semiconductor subscriber interface circuit that has improved immunity to voltage spikes caused, for example, by lightning strikes.

It is still another object of the present invention to provide a subscriber interface circuit that has improved overcurrent immunity.

In view of these objects, and others, the present invention provides a subscriber line interface circuit using integrated semiconductor circuits that has improved immunity to overvoltage and overcurrent conditions and sufficiently improved survivability to be well-suited for subscriber loop to central office applications. The battery feed resistors in series with the ring and tip lines of the subscriber loop are increased well above the values required to provide the industry standard loop current and impedance matching. The increased resistance increases the impedance encountered by a lightning-induced voltage spike to increase the survivability of the semiconductor circuit components. In order to compensate for the decreased subscriber DC loop current, the battery supply voltage is increased to effect a commensurate increase in loop current, and, in order to compensate for increased AC impedance consequent to the increased battery feed resistance, impedance adjustment is accomplished using appropriately configured operational amplifiers. A thermally responsive sensor is mounted in a heat-conducting relationship with one or more of the resistive elements in the subscriber loop with an increase in the sensed temperature representing an overcurrent situation, such as power line cross-over, and provides a control signal effective to disconnect the subscriber loop from interface circuit.

In the preferred embodiment, a bi-impedance thermal poly switch provides the temperature sensing function and is configured to provide a corresponding bi-level output signal that is directly usable as a digital signal to strobe a data line, such as the input to a stored program controlled microprocessor that is programmed to disconnected the subscriber loop from the interface circuits in an overcurrent situation and reconnect the subscriber loop when the subscriber loop thermal sensor returns to normal temperature operation. The microprocessor is controlled to operate through a selected number of over temperature cycles and issue a service call request to the appropriate destination.

The present invention advantageously provides a subscriber interface circuit that utilizes semiconductor integrated circuits in a manner that provides improved survivability by increasing immunity to overvoltage spikes induced by lightning and overcurrent conditions induced by power line cross-over and with decreased service requirements by providing intelligent control in overcurrent situations.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
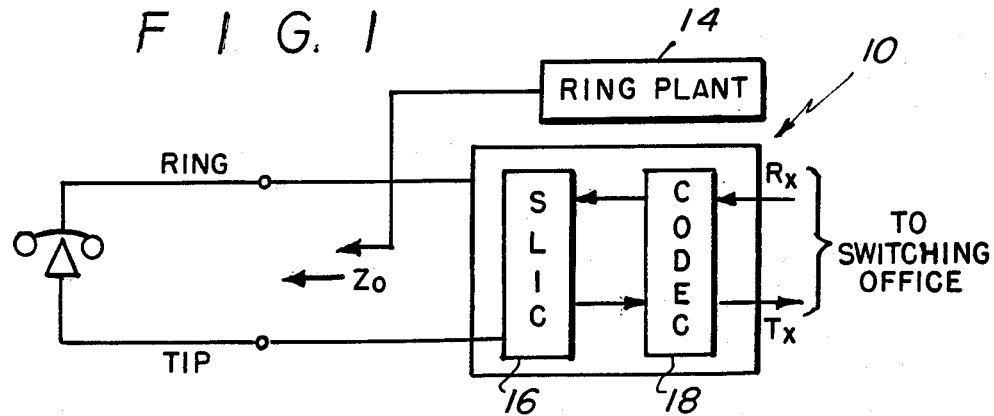
FIG. 1 is a functional block diagram of a subscriber loop and connected interface circuit.

A subscriber interface circuit in accordance with the present invention is shown in general form in FIG. 1 and designated generally by the reference character 10. The subscriber interface circuit serves to interface a subscriber station, indicated generally at 12, through a 2-wire subscriber loop having RING and TIP lines to a switching office (not shown) through receive and transmit lines $R_x$ and $T_x$, respectively. A ring generator, indicated generally at 14, is selectively coupled to the subscriber loop via a relay or other switching device (not shown in FIG. 1) to provide a ring signal to the subscriber station 12. The subscriber interface circuit 10 includes a subscriber line interface circuit 16 and a co-operating coder/decoder 18. In the preferred embodiment, the subscriber interface circuit 16 is a HC 5509 integrated subscriber line interface circuit (SLIC) manufactured by the Semiconductor Analog Products Division of the Harris Corporation of Melbourne, Fla., and the coder/decoder 18 is a TP3051 integrated circuit manufactured by the National Semiconductor Corporation of Santa Clara, Calif. Further details as to the internal organization of the HC 5509 SLIC may be obtained from Harris Application Note No. 549, the disclosure of which is incorporated herein by reference.

Figure 2:
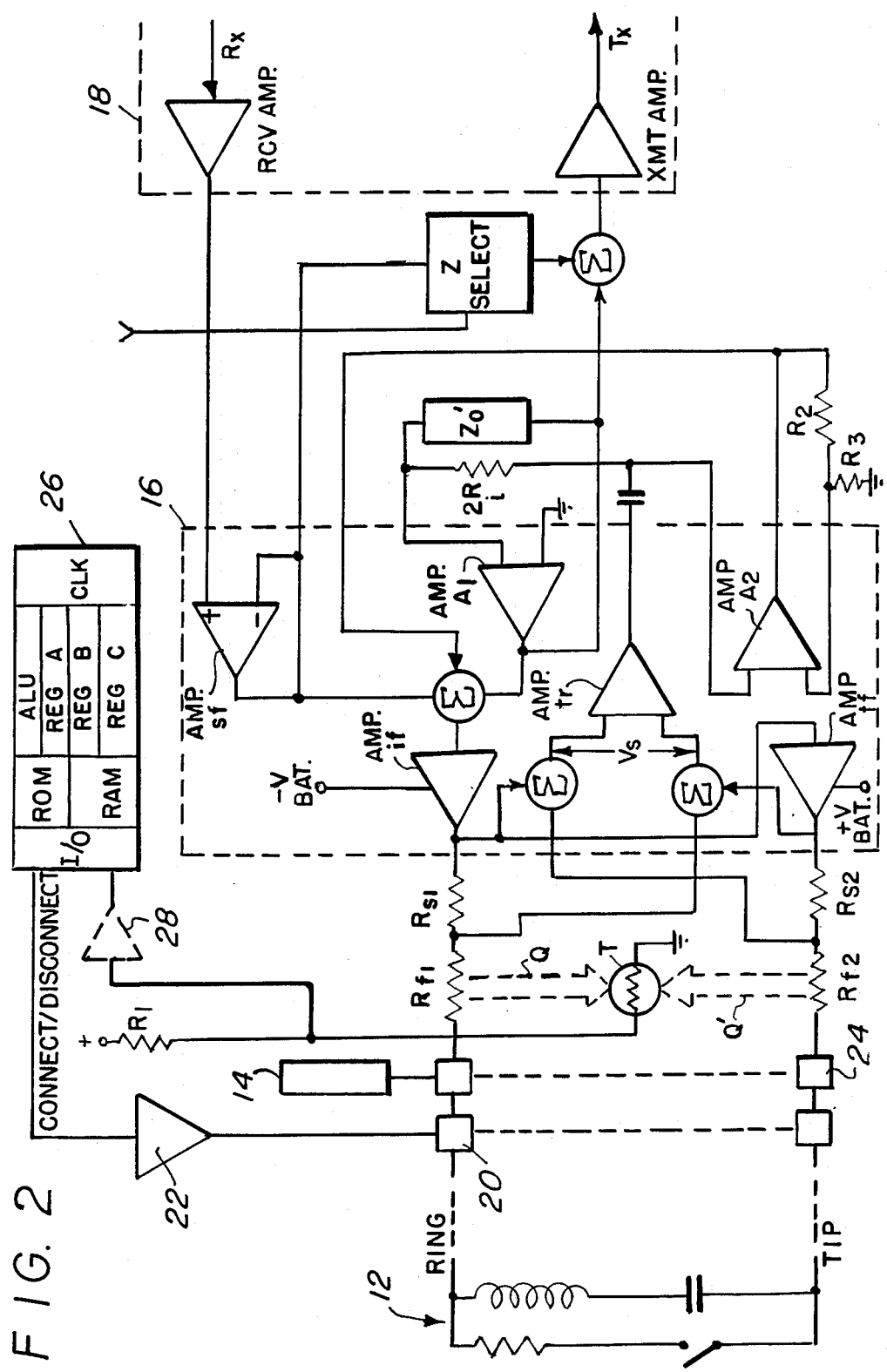
FIG. 2 is a detailed functional block diagram of the subscriber interface circuit of FIG. 1.

As shown in FIG. 2, the subscriber interface circuit 16 includes, among other functional blocks, a ring feed amplifier $AMP_{rf}$ and a tip feed amplifier $AMP_{tf}$ for driving the RING and TIP lines, respectively, a transversal amplifier $AMP_{tr}$ for amplifying a voltage obtained from the subscriber loop and representative of the voice signal, a signal feed amplifier $AMP_{sf}$ for presenting the output of the coder/decoder 18 to the ring feed amplifier $AMP_{rf}$, and first and second impedance control amplifiers $AMP_1$ and $AMP_2$ for effecting impedance adjustment as described more fully below.

The subscriber station 12 is represented by a RLC network and switchhook (unnumbered), as is conventional in the art, and connected on one side by the RING line to the output of the ring feed amplifier $AMP_{rf}$ and on the other side through the TIP line to the tip feed amplifier $AMP_{tp}$ to define the subscriber loop. A cut-off relay 20 is connected in the subscriber loop and is controlled by a relay driver 22 to disconnect the subscriber loop from the subscriber interface circuit 16 as described more fully below. Additionally, a ring control relay 24 is connected in the subscriber loop and serves to selectively disconnect the subscriber loop from the subscriber interface circuit 16 and connect the subscriber loop to the ring generator 14 to provide a 20 Hz 110 VRMS ringing signal until the off-hook signal is detected. As can be appreciated, the cut-off relay 20 and the ring control relay 24 functions can be incorporated into a single, multi-function relay. Additionally, series-connected sense resistors $R_{s1}$ and $R_{s2}$ and battery feed resistors $R_{f1}$ and $R_{f2}$ are provided in the RING line and the TIP line with these resistors functioning as voltage dividers to provide a voltage signal to the transversal amplifier $AMP_{tr}$ within the subscriber interface circuit 16, as described below.

A temperature responsive device T, such as a thermistor or bi-impedance polyswitch is mounted in heat conducting relationship with one or more of the resistors $R_{s1}$, $R_{s2}$, $R_{f1}$, and $R_{f2}$, as schematically represented by the heat conduction paths Q and Q' (dotted-line illustration) between the resistors $R_{f1}$ and $R_{f2}$. The temperature responsive device T is connected to a voltage supply through a series resistor $R_1$ with the voltage present at the node between the temperature responsive device T and the resistor $R_1$ presented to a microprocessor 26 which functions, as explained more fully below, to disconnect and reconnect the subscriber loop from the subscriber line interface circuit 16 in response to the output of the temperature responsive sensor T in accordance with the flow diagram of FIG. 5. The microprocessor 26 is of conventional organization and includes an I/O port, a read-only memory (ROM) containing a stored control program that implements, among other functions, the flow diagram of FIG. 5, a random-access memory (RAM) for storing values assigned to variables; an arithmetic-logic unit (ALU); one or more storage registers Reg. A, Reg. B, Reg. C . . . , for manipulating data; and a clock CLK. Suitable microprocessors include the 8031/8051 series manufactured by the Intel Corp. of Santa Clara, Calif.

The subscriber interface circuit 16 is designed to provide a minimum current of 20 ma. in a subscriber loop having a nominal DC impedance of 2000 ohms with the sense resistors $R_{s1}$ and $R_{s2}$ and the battery feed resistors $R_{f1}$ and $R_{f2}$ having a resistance of 50 ohms, this value specified by the manufacturer of the subscriber interface circuit 16. In view of the lower tolerance of semiconductor devices to overvoltage conditions incident to lightning strikes, for example, the resistance of the battery feed resistors $R_{f1}$ and $R_{f2}$ is increased in accordance with the present invention to increase the impedance seen by any voltage spike and thus increase the survivability of the device with regard to lightning caused overvoltage conditions. The increased resistance lowers the loop current and requires that the supply voltage $V_{bat}$ be increased. Since the supply voltage $V_{bat}$ is limited to a maximum for the particular subscriber interface circuit 16 and in view of the manufacturer-prescribed value of 50 ohms for the sense resistors $R_{s1}$ and $R_{s2}$, the maximum value of the battery feed resistors $R_{f1}$ and $R_{f2}$ is a function of and is controlled by the maximum permissible battery supply voltage $V_{bat}$, a value of 57 volts $+/-5\%$ being the maximum for the subscriber interface circuit 16 specified above. The maximum permissible values for the battery feed resistors $R_{f1}$ and $R_{f2}$ for the maximum permissible battery supply voltage $V_{bat}$ is determined from the voltage drops about the subscriber loop, assuming a 2000 ohms DC loop impedance, a 20 ma. minimum loop current, and a four-volt drop for each of the ring feed and tip feed amplifiers $AMP_{rf}$ and $AMP_{tf}$ as follows:

$$V_{bat} = (4\text{ v} + 4\text{ v}) + [(2000 + R_{s1} + R_{s2} + R_{f1} + R_{f2})\text{ohms} \times 20\text{ ma.}]$$

and for $R_{s1}$ and $R_{s2}$ specified at 50 ohms $$R_{f1} + R_{f2} = 350 \text{ ohms}$$

For the conditions presented above and in accordance with the present invention, the value of the battery feed resistors $R_{f1}$ and $R_{f2}$ is increased from the manufacturer specified values of 50 ohms to 175 ohms each for a ratio factor K of 3.5. While the ratio factor K of 3.5 provides the maximum increase in voltage spike immunity, ratio factors as low as 1.5 are suitable. The increased resistance for the battery feed resistors $R_{f1}$ and $R_{f2}$ provides for a number of practical advantages in that the immunity to lightning induced voltage spikes is increased dramatically thereby enhancing the survivability of the semiconductor subscriber interface circuit 16.

The increased battery feed resistors $R_{f1}$ and $R_{f2}$ requires that the input impedance parameter be reconfigured to achieve the 900 ohm plus 2.16 microfarad input impedance. In the specified subscriber interface circuit 16, operational amplifiers AMP $A_1$ and AMP $A_2$ are used to achieve input impedance matching by deriving the value of a transfer function H(s) as follows in connection with the diagram of FIG. 3.

$$V_L = [(k+1) \times R_s] \times i_s + V_o \quad \text{Eq. 1}$$

$$V_o = V_L - [(k+1) \times R_s] \times i_s \quad \text{Eq. 1a}$$

$$i_s = V_s/R_s \quad \text{Eq. 2}$$

$$V_L = i_s \times Z_o \quad \text{Eq. 3}$$

substituting Eq. 2 into Eq. 3

$$V_L = V_s \times Z_o/R_s \quad \text{Eq. 4}$$

substituting Eq. 2 and Eq. 4 into Eq. 1a $$V_o = V_s[Z_o/R_s - (k+1)] \quad \text{Eq. 5}$$

Figure 3:
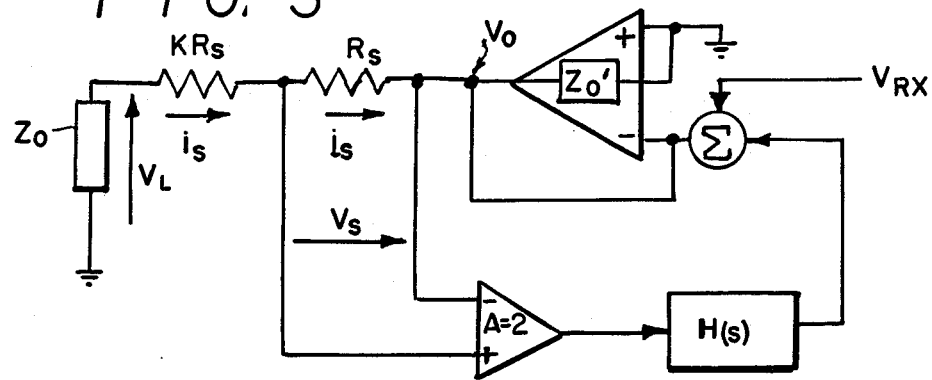
FIG. 3 is a circuit diagram illustrating the manner by which impedance compensation or re-matching is accomplished for the subscriber interface circuit of FIG. 2.

As also shown in FIG. 3, the voltage $V_o$ is equal to $V_s$ times twice the transfer function H(s), for an amplifier gain of two. The impedance transfer function H(s) is equal to $Z_o/2R_s - (K+1)/2$. As shown in FIG. 2, the amplifier AMP $A_1$ is configured with resistance values $R_s'$ and impedance value $Z_o'$ to provide a gain equal to $-(Z_o/2R_s)$ and the amplifier AMP $A_2$ is configured with resistors $R_2$ and $R_3$ to provide a gain equal to $(k+1)/2$ with the two output values of the amplifiers AMP $A_1$ and AMP $A_2$ summed and presented to the input of the ring feed amplifier $AMP_{rf}$ to modify the gain and phase to compensate for the increased values of the battery feed resistors $R_f$.

As can be appreciated from the above, the increased resistance of the battery feed resistors $R_{f1}$ and $R_{f2}$ greatly increases the survivability of the semiconductor subscriber interface circuit 16 while the impedance compensation maintains impedance matching within the circuit.

Figure 4:
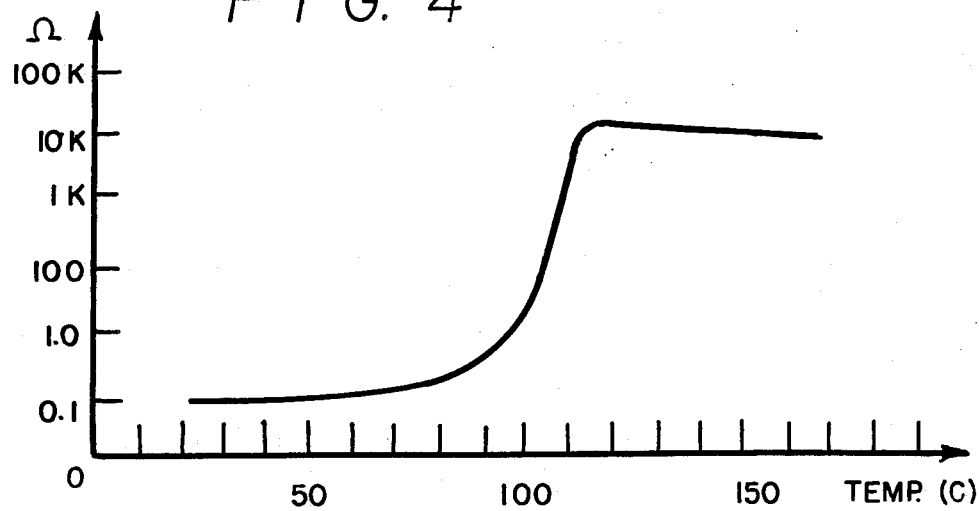
FIG. 4 is a graph illustrating the resistance/temperature characteristics of a temperature sensor; and, FIG. 5 is a flow diagram illustrating the control sequence or a portion of the subscriber interface circuit of FIG. 2.

In conventional subscriber interfaces, overcurrent conditions due to 60 Hz power line cross-over into the subscriber loop has been addressed by inserting fusible components into the RING and TIP lines with these fuses interrupting the circuit in the event of an overcurrent condition. While fusing is relatively reliable, an opened fuse represents a service and repair requirement. The present invention obviates the service and repair requirement by providing a thermally responsive sensor T in heat conducting relationship with one or more of the RING or TIP resistors, preferably with the battery feed resistors $R_{f1}$ and $R_{f2}$ as represented in FIG. 2 by the heat conduction paths Q and Q'. In the preferred embodiment, the temperature responsive sensor T is a positive temperature coefficient (PTC) bi-impedance polyswitch having the resistance/temperature characteristics shown in FIG. 4. These devices are fabricated from heat expansible polymers mixed with conductive particles, such as carbon or metallic particles. Suitable devices include the 4007 poly PTC supplied by Midwest Components, Inc. of Muskegon, Mich. The temperature responsive sensor T is in series circuit with the resistor $R_1$ and at normal-current operating temperatures for the battery feed resistors $R_{f1}$ and $R_{f2}$, the node between the temperature responsive sensor T and the resistor $R_1$ is pulled low. In the event of an overcurrent condition caused by a 60 Hz power line cross-over, the battery feed resistors $R_{f1}$ and $R_{f2}$ undergo Joule heating and raise the temperature of the temperature responsive sensor T to increase its resistance and cause the voltage at the node between the temperature responsive sensor T and the resistor $R_1$ to increase. In the preferred embodiment, the resistance values and the voltage applied to the resistor $R_1$ are selected so that the voltage at the node between the temperature responsive sensor T and the resistor $R_1$ at normal and overcurrent temperatures corresponds to TTL logic values of binary LO and HI (e.g., approximately 0.8 volts and 2.4 volts, respectively). The voltage at the node between the temperature responsive sensor T and the resistor $R_1$ is presented directly to the microprocessor 26 which provide appropriate control signals 'connect/disconnect' to the cut-off relay 20 to disconnect the subscriber loop from the subscriber interface circuit 16 and thus prevent damage in an overcurrent situation. If desired, a buffer or inverter 28 (shown in dotted line illustration) may be inserted into the circuit path to the microprocessor 26 to further condition the temperature signal.

Figure 5:
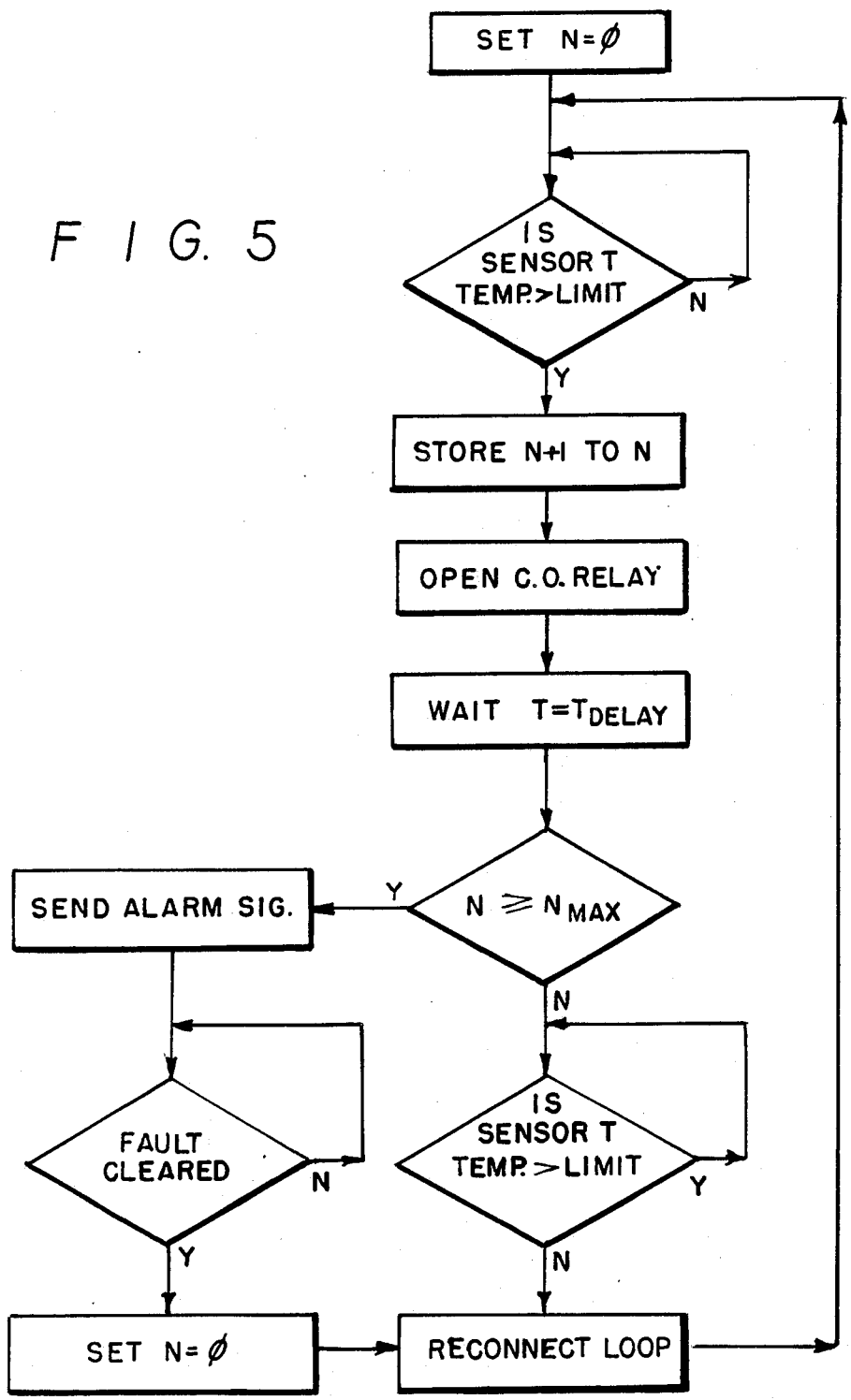

The microprocessor 26 can function to disconnect the subscriber loop in the event of an overcurrent situation or, more preferably and as shown in FIG. 5, function as an intelligent controller. As shown, a variable N, representing the total number of over temperature incidents, is initialized to zero and a query presented to determine if the temperature responsive sensor T indicates an over temperature condition as a consequence to an overcurrent condition. If no over temperature condition is indicated, the program control loops about the query, and, if an over temperature situation is indicated, the variable N is incremented by one and the microprocessor sends a 'disconnect' command to the cut-off relay 20 to disconnect the subscriber loop and prevent damage to the subscriber line interface circuit 16. After the expiration of a predetermined time delay, a query is presented to determine if the variable N is a maximum value, for example, three. If the variable is at its maximum, an alarm signal is sent to the appropriate maintenance and repair facility. When the fault is cleared, the variable N is reset to zero with the program executing to reconnect the subscriber loop by sending a 'connect' command to the cut-off relay 20. Where the variable N is not at its maximum value, a query is presented to determine if the temperature responsive sensor T still indicates an over temperature condition, and, if so, the program control loops about this query until the temperature responsive sensor T indicates the temperature is below the maximum value. When the temperature responsive sensor T indicates the temperature is below the maximum value, the microprocessor 26 reconnects the subscriber loop by sending a 'connect' command to the cut-off relay 20.

In the preferred embodiment described above, the polyswitch desirably performs the temperature sensing function because of its relatively fast response time and the ease with which a digital signal is developed. As can be appreciated, other arrangements are suitable, including linear thermistors in a Wheatstone bridge configuration with a Schmidt trigger providing an appropriately conditioned signal to the microprocessor or other functionally equivalent logic circuitry.

The present invention advantageously provides a subscriber interface circuit that utilizes semiconductor integrated circuits in a manner which provides improved survivability by increasing immunity to overvoltage spikes induced by lightning and overcurrent conditions induced by power line cross-over and with decreased service requirements by providing intelligent control in overcurrent situations.

Thus it will be appreciated from the above that as a result of the present invention, a semiconductor subscriber line interface circuit with enhanced survivability is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An improved telephone subscriber line interface circuit, comprising:
   means for effecting a connection interface with a subscriber loop of the type having a subscriber station in circuit with ring and tip lines and including an amplifier for driving the ring line, an amplifier for driving the tip line, and an amplifier for accepting a signal representative of the current in the subscriber loop; and
   resistive network means in circuit in the ring and tip lines to provide a signal to the third-mentioned amplifier and including first and second series connected resistors in the ring line and first and second series connected resistors in the tip line, the resistance of the second resistors greater than that of the first resistors by a factor K, where K is greater than 1.5.

2. The subscriber line interface circuit of claim 1, wherein the voltage at the node between each first and second resistor is presented to the third-mentioned amplifier.

3. The subscriber line interface circuit of claim 1, wherein the factor K is about 3.5.

4. The subscriber line interface circuit of claim 1, wherein the first resistors each have a value of about 50 ohms.

5. The subscriber line interface circuit of claim 4, wherein the second resistors have a value greater than 100 ohms.

6. The subscriber line interface circuit of claim 5, wherein the second resistors have a value of 175 ohms.

7. The subscriber line interface circuit of claim 1, further comprising:
   means for adjusting the impedance characteristics of said first- and second-mentioned amplifiers as a function of the factor K.

8. The subscriber line interface circuit of claim 7, wherein said means for adjusting comprises at least one operational amplifier in circuit with an input to one of said first- and second-mentioned amplifiers.

9. The subscriber line interface circuit of claim 7, wherein the factor K is about 3.5.

10. The subscriber line interface circuit of claim 9, wherein the first resistors have a value of about 50 ohms.

11. The subscriber line interface circuit of claim 10, wherein the second resistors have a value of 175 ohms.

12. An improved telephone subscriber line interface circuit, comprising:
    means for effecting a connection interface with a subscriber loop of the type having a subscriber station in circuit with ring and tip lines and including an amplifier for driving the ring line, an amplifier for driving the tip line, and an amplifier for accepting a signal representative of the current in the subscriber loop;
    resistive means in circuit in the ring and tip lines between the subscriber station and the first- and second-mentioned amplifiers for providing a signal to the third-mentioned amplifier; and
    means for sensing the temperature of said resistive means and disconnecting the subscriber loop from said first-mentioned means when the sensed temperature is above a selected limit.

13. The subscriber line interface circuit of claim 12, wherein said third-mentioned means reconnects the subscriber loop to said first-mentioned means when the sensed temperature is below the selected limit.

14. The subscriber line interface circuit of claim 12, wherein said third-mentioned means comprises:
    thermally responsive resistor means having a resistance that varies as a function of its temperature, said thermally responsive resistor means in heat transfer relationship with said second-mentioned means; and
    controller means connected to said thermally responsive resistor means to disconnect the first-mentioned means when the sensed temperature is above the selected limit.

15. The subscriber line interface circuit of claim 14, wherein said thermally responsive resistor means comprises a bi-impedance resistive device having first and second principal impedance values.

16. The subscriber line interface circuit of claim 15, wherein said bi-impedance resistive device is in series circuit with another resistor to define a voltage divider, the voltage at the node between the bi-impedance device and the other resistor representative of the firs or second principal impedance value of the bi-impedance resistive device.

17. The subscriber line interface circuit of claim 14, wherein said controller means comprises:
    a stored-program controlled processor for accepting a value from said thermally responsive resistor means and providing an output signal therefrom.

18. The subscriber line interface circuit of claim 17, wherein said controller means further comprises:
    switching means responsive to an output signal from said stored-program controlled processor to selectively disconnect said first-mentioned means from said subscriber loop.

19. An improved telephone subscriber line interface circuit, comprising:
    means for effecting a connection interface with a subscriber loop of the type having a subscriber station in circuit with ring and tip lines and including an amplifier for driving the ring line, an amplifier for driving the tip line, and an amplifier for accepting a signal representative of the current in the subscriber loop;
    resistive means in circuit in the ring and tip lines and including first and second series connected resistors in the ring line and first and second series connected resistors in the tip line, the resistance of the second resistors greater than that of the first resistors by a factor K, where K is greater than 1.5; and
    means for sensing the temperature of said resistive means and disconnecting the subscriber loop from said first-mentioned means when the sensed temperature is above a selected limit.

20. The subscriber line interface circuit of claim 19, wherein the voltage at the node between each first and second resistor is presented to the third-mentioned amplifier.

21. The subscriber line interface circuit of claim 19, wherein the factor K is about 3.5.

22. The subscriber line interface circuit of claim 19, wherein the first resistors have a value of about 50 ohms.

23. The subscriber line interface circuit of claim 22, wherein the second resistors have a value greater than 100 ohms.

24. The subscriber line interface circuit of claim 23, wherein the second resistors have a value of about 175 ohms.

25. The subscriber line interface circuit of claim 19, further comprising:
    means for adjusting the impedance characteristics of said first- and second-mentioned amplifiers as a function of the factor K.

26. The subscriber line interface circuit of claim 25, wherein said means for adjusting comprises at least one operational amplifier in circuit with an input to one of said first and second amplifiers.

27. The subscriber line interface circuit of claim 19, wherein said third-mentioned means reconnects the subscriber loop to said first-mentioned means when the sensed temperature is below the selected limit.

28. The subscriber line interface circuit of claim 27, wherein said third-mentioned means comprises:
    thermally responsive resistor means having a resistance that varies as a function of its temperature, said thermally responsive resistor means in heat transfer relationship with said second-mentioned means; and
    controller means connected to said thermally responsive resistor means to disconnect the first-mentioned means when the sensed temperature is above the selected limit.

29. The subscriber line interface circuit of claim 28, wherein said thermally responsive resistor means comprises a bi-impedance resistive device having first and second principal impedance values.

30. The subscriber line interface circuit of claim 29, wherein said bi-impedance resistive device is in series circuit with another resistor to define a voltage divider, the voltage at the node between the bi-impedance device and the other resistor representative of the first or second principal impedance value of the bi-impedance resistive device.

31. The subscriber line interface circuit of claim 29, wherein said controller means comprises:
    a stored-program controlled processor for accepting a value from said thermally responsive resistor means and providing an output signal therefrom.

32. The subscriber line interface circuit of claim 29, wherein said controller means further comprises:
    switching means responsive to an output signal from said stored-program controlled processor to selectively disconnect said first mentioned means from said subscriber loop.

* * * * *